Aug. 17, 1937.  V. E. ATKINS  2,090,509
FLOOR COVERING AND METHOD OF MAKING SAME
Filed Nov. 3, 1933
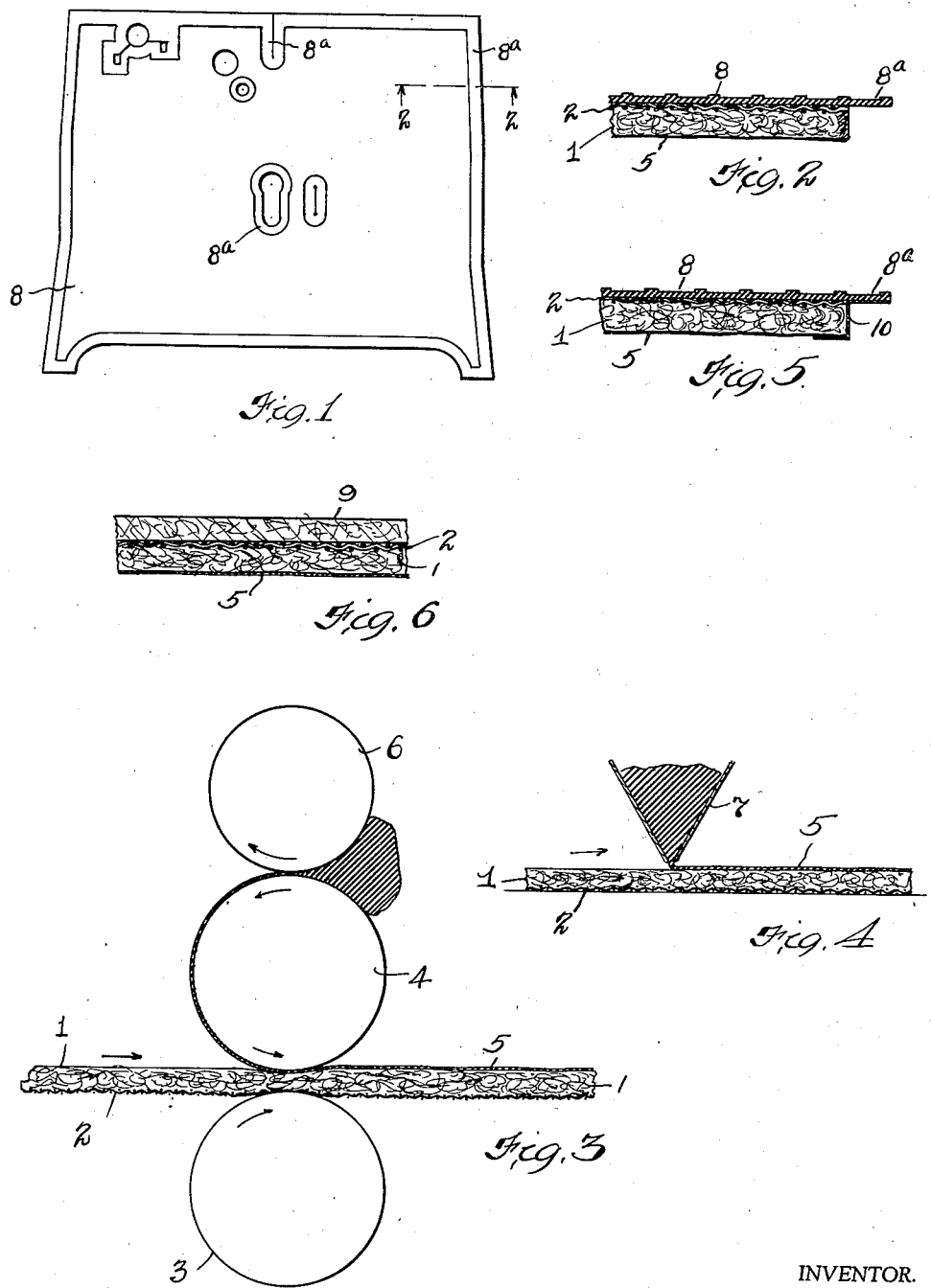
INVENTOR.
Vaol E. Atkins
BY
Fay, Oberlin & Fay
ATTORNEYS.

Patented Aug. 17, 1937

2,090,509

UNITED STATES PATENT OFFICE 2,090,509

FLOOR COVERING AND METHOD OF MAKING SAME

Vaol E. Atkins, Akron, Ohio, assignor to The Paine & Williams Company, Cleveland, Ohio, a corporation of Ohio Application November 3, 1933, Serial No. 696,569

2 Claims. (Cl. 154—2)

This invention relates, as indicated, to improved floor coverings for automobiles and the like, and also involves an efficient and at the same time inexpensive method of making such coverings.

In general the present improved type of covering embodies certain of the features of the composite floor covering described and claimed in U. S. Patent No. 1,715,523 to W. S. Turner, dated June 4, 1929. In other words, in its preferred form, the present covering comprises an upper wearing-surface layer of flexible vulcanized rubber and a loosely compacted fibrous base. This construction of floor covering has found very extensive use in the form of automobile floor mats.

It has also been proposed to make floor coverings of the character by adhering or otherwise assembling sheets of rubber in contact with opposite surfaces of a layer of felt or similar material of fibrous matted character. Such method of making floor coverings, involving as it does the use of previously cut-to-size sheets of uncured rubber of substantial thickness and the subsequent vulcanization of both such sheets to each other and to the layer of felt by suitable molding equipment, is slow and expensive and, moreover, the pressure and heat of the vulcanizing operation results in excessive matting or compacting of the felt, whereby the latter loses some of its resilience. It has been necessary, in such cases, to restore the resiliency of the felt, as by means of a steaming operation, which adds considerably to the cost of the finished product.

One principal object of the present invention is to provide a method of manufacturing floor coverings of the character described which will involve the use of a minimum amount of rubber for the bottom or non-wearing layer of the floor covering, and in which hot vulcanizing operations in the assembly of the various parts of the mat are avoided. Another object of the invention is to provide a method whereby floor coverings of this type and character may be made rapidly and inexpensively. A further object of the invention is to provide a floor covering of novel construction resulting from the aforesaid method of manufacture.

To the accomplishment of the foregoing and related ends, said invention, then, consists of the means hereinafter fully described and particularly pointed out in the claims, the annexed drawing and the following description setting forth in detail several methods and products, which constitute, however, but a few of the various applications of the principle of my invention.

In said annexed drawing:—

Fig. 1 is a plan view of an automobile floor mat made in accordance with the invention; Fig. 2 is a fragmentary cross-sectional view of the mat, taken on the line 2—2 of Fig. 1; Fig. 3 is a view illustrating more or less diagrammatically one of the steps employed in making the mat; Fig. 4 is a view illustrating more or less diagrammatically a modification of the step shown in Fig. 3; Fig. 5 is a view, similar to Fig. 2, but showing a modified form of waterproofing for the edge of the mat; and Fig. 6 is a fragmentary cross-sectional view of a mat having a wearing layer of carpeting.

Referring more particularly to the drawing, I have shown in Fig. 1 a mat made in accordance with the present invention and especially adapted for use as a floor covering for the front compartment of an automobile. Such illustrative mat comprises, as in the case of the commercial automobile floor mat heretofore referred to, an upper wearing-surface layer of flexible vulcanized rubber and a loosely compacted fibrous base. The composition of such rubber layer and the degree of vulcanization to which it is subjected are substantially the same as in the case of ordinary rubber matting, although it may be preferable in such cases to leave such layer somewhat softer and correspondingly more flexible. The upper surface of said layer of vulcanized rubber may be formed with ribs or other ornamental designs of any desired contour, and in the case of a mat intended to fit a specific floor space, such layer will also be formed with a border extending along the respective edges of the mat as well as around such openings as may be required for the passage through the mat of operating levers and the like that form part of the automobile driving mechanism.

The material of the base may vary, but it will be preferably composed of fine fibers loosely interwoven or otherwise compacted together so as to provide a resilient foundation for the upper layer of rubber, the thickness being sufficient to give a soft carpet feel when such rubber layer is trod upon. A very satisfactory material for such base or body layer of the mat is so-called hair felt, which is made from the hair of cattle or like animal, although equivalent vegetable fibers may be substituted in whole or in part for such hair. If desired, such fibrous layer may include a layer of fabric stitched thereto or otherwise incorporated therein. Such stitching may be accomplished either by passing thread through the fibrous layer and fabric sheet or by punching the fibrous layer at intervals through the sheet of fabric so as to cause the two to adhere together in more or less permanent fashion.

In making such a mat, I prefer to start with a layer 1 of felt or other similar resilient material of a matted fibrous character and which may have secured thereto, in the manner just described above, a sheet 2 of fabric of open weave, such as burlap or netting. This material, which may be in roll form and of any desired length base or body, is passed in the direction indicated by the arrow in Fig. 3 between rolls 3 and 4. The roll 3 constitutes a backing roll for the layer of felt 1, while the roll 4 constitutes a calender roll, whereby an extremely thin layer 5, which I term a skin coat, of a rubber composition, is applied and caused to adhere to that surface of the felt layer which is opposite the fabric sheet 2.

This rubber composition is preferably, but not necessarily, of a type which becomes cured when exposed to air, either at normal or elevated temperatures, and for this purpose usually contains a special accelerator, the nature of which will be readily understood by those skilled in the rubber-making art. The composition, which is of a doughy consistency, is fed onto the top of roll 4, and the thickness of the layer is controlled by means of a doctor roll 6, mounted above and vertically adjustable with respect to the roll 4. When a rubber composition of the aforesaid character is used, it will be of a sufficiently tacky nature to adhere to the fibers of the felt and when it becomes cured, it will be found to have become uniformly bonded to the felt, presenting a somewhat wavy appearance corresponding to the surface of the felt.

Instead of applying the uncured rubber composition to the felt in the manner described, I may apply it to the felt in a manner which is more or less diagrammatically illustrated in Fig. 4. In this case, the felt layer is caused to move in the direction indicated by the arrow while suitably supported, and during such movement, the rubber composition is flowed thereon in a thin layer from a hopper 7, the hopper constituting, in effect, a spreader for applying the skin coat of rubber.

Instead of applying to the felt an uncured rubber composition as described, I may apply to the felt, as by means of a suitable rubber cement, an extremely thin sheet of vulcanized rubber.

In either case, the skin coat, as the name implies, should be of such thickness as to be substantially impervious to the passage of air and water, but not of a thickness to materially affect the flexibility of the felt itself. In practice, I have found that such under coat, where made in the manner described, may approximate in thinness a sheet of ordinary wrapping paper; in other words, need be only one-fifth or less the minimum thickness of the upper wearing layer which in commercial feltback mats will run around seventy-five thousandths (0.075) of an inch.

After the skin coat has been applied to the felt, the material is preferably cut to the size and shape of the finished mat, and thereafter, there is applied to the opposite surface of the felt layer a wearing layer 8 of rubber, as shown in Figs. 1, 2 and 5, or a layer of carpeting or other woven fabric 9, as shown in Fig. 6. The layer 8 is preferably made in the form of a previously molded and vulcanized rubber mat of a size and shape to provide a marginal portion which extends beyond the edges of the felt. The wearing layer of rubber or carpeting is secured to the fabric 2, as by means of a suitable cement or the like.

The exposed edges of the felt may be either left in their natural condition, or sealed or waterproofed as by impregnating such edges with a liquid rubber composition, as shown in Fig. 2, or by applying to such edges a strip 10 of rubber, rubberized fabric or similar material, as shown in Fig. 5.

The skin coat 5 of rubber is effective not only to prevent the passage of water into the felt layer of the floor covering but is also effective to prevent the transfer of an undesirable amount of heat into the automobile, and to prevent slipping of the mat on the floor boards.

It will be noted that in making floor mats by the methods which have been described, vulcanizing operations incidental to the assembly of the various parts of the mat are entirely dispensed with, and no special molding equipment is required. Moreover, the fibrous felt layer of the mat is not subjected to excessive compacting, and the felt accordingly retains much of its original flexibility and insulating properties.

Although the invention has been described with particular reference to automobile floor mats, it will be understood that it may be used in the manufacture of floor coverings for various other purposes. Thus such mat may be of any desired size and shape, e. g., instead of being designed, as in the illustrated form, to fit the floor of an automobile body, it may be utilized as a stair tread cover or form a rug or carpet for a room, especially where the upper wearing layer comprises any familiar type of textile used on floors.

Other forms may be employed embodying the features of my invention instead of the one herein explained, change being made as regards the means and the steps herein disclosed, provided the elements stated by any of the following claims or the equivalent of such stated elements be employed, whether produced by my preferred method or by other embodying steps equivalent to those stated in the following claims, I therefore particularly point out and distinctly claim as my invention:—

1. The method of making floor coverings for automobiles and the like which comprises providing a layer of loosely compacted fibrous material, calendering on one surface thereof a skin coat of an uncured air-curable rubber composition, cutting the material so treated to the desired shape, and then, without substantial additional compacting of the fibrous material, securing to the opposite surface thereof a wearing layer of vulcanized rubber of substantially the same shape as the fibrous material.

2. The method of making floor coverings for automobiles and the like which comprises providing a layer of loosely compacted fibrous material, calendering on one surface thereof a skin coat of an uncured air-curable rubber composition, cutting the material so treated to the desired shape, then, without substantial additional compacting of the fibrous material, securing to the opposite surface thereof a wearing layer of vulcanized rubber of substantially the same shape as the fibrous material, and then applying to the exposed edges of said fibrous material a layer of water-impervious material.

VAOL E. ATKINS.